(12) United States Patent
Schulz et al.

(10) Patent No.: US 7,002,318 B1
(45) Date of Patent: Feb. 21, 2006

(54) POSITION SENSOR FAULT TOLERANT CONTROL FOR AUTOMOTIVE PROPULSION SYSTEM

(75) Inventors: Steven E. Schulz, Torrance, CA (US); Sean E Gleason, West Bloomfield, MI (US); Nitinkumar R. Patel, Cypress, CA (US); James M. Nagashima, Cerritos, CA (US); Yu-Seok Jeong, Seoul (KR); Seung Ki Sul, Seoul (KR); Michael Milani, San Pedro, CA (US)

(73) Assignee: General Motors Corporation, Detroit, MI (US)

(*) Notice: Subject to any disclaimer, the term of this patent is extended or adjusted under 35 U.S.C. 154(b) by 67 days.

(21) Appl. No.: 10/948,630

(22) Filed: Sep. 23, 2004

(51) Int. Cl.
*H02P 7/50* (2006.01)
*B80L 3/00* (2006.01)

(52) U.S. Cl. .................. 318/782; 318/437; 318/474; 318/490

(58) Field of Classification Search ........... 318/782, 318/254, 439, 138, 811, 474, 490, 437; 361/23, 361/31; 341/9, 3
See application file for complete search history.

(56) References Cited

U.S. PATENT DOCUMENTS

| | | | | |
|---|---|---|---|---|
| 4,528,486 A | * | 7/1985 | Flaig et al. | 318/254 |
| 4,546,293 A | * | 10/1985 | Peterson et al. | 318/254 |
| 4,686,437 A | * | 8/1987 | Langley et al. | 318/254 |
| 4,761,703 A | * | 8/1988 | Kliman et al. | 361/23 |
| 5,357,181 A | * | 10/1994 | Mutoh et al. | 318/139 |
| 5,469,032 A | * | 11/1995 | Otake | 318/439 |
| 5,650,779 A | * | 7/1997 | Sugden | 341/9 |
| 5,652,494 A | * | 7/1997 | Sugden | 318/701 |
| 6,236,179 B1 | * | 5/2001 | Lawler et al. | 318/439 |
| 2005/0073273 A1 | * | 4/2005 | Maslov et al. | 318/437 |

OTHER PUBLICATIONS

"Fault Tolerant Operation of Induction Motor Drives with Automatic Controller Reconfiguration", Sepe, R.B., Jr.; Fahimi, B.; Morrison, C.; Miller, J.M.; Electric Machines and Drives Conference, 2001. IEMDC 2001. IEEE International, 2001, pp.: 156-162.

\* cited by examiner

*Primary Examiner*—Paul Ip
(74) *Attorney, Agent, or Firm*—Christopher DeVries (57) ABSTRACT

A control system for a motor including a rotor comprises a sensorless sensor module that includes a saliency-based estimator module that generates a first rotor position signal based on saliency and a back electromotive force (emf) estimator module that generates a second rotor position signal based on back emf. A selector selects the first rotor position signal for rotor speeds below a first rotor speed and the second rotor position signal for rotor speeds above the first rotor speed. A rotor position sensor senses a position of the rotor and generates a third rotor position signal. A fault detection module senses faults in the rotor position sensor and outputs the third rotor position signal when a fault is not detected and one of the first and second rotor position signals when the fault is detected. An indirect field oriented control (IFOC) system controls the motor based on a selected one of the first, second and third rotor position signals.

18 Claims, 11 Drawing Sheets

POSITION SENSOR FAULT TOLERANT CONTROL FOR AUTOMOTIVE PROPULSION SYSTEM

FIELD OF THE INVENTION

The present invention relates to motors, and more particularly to the control of motors using sensor-based and sensorless approaches.

BACKGROUND OF THE INVENTION

Electric motor drives are becoming more prevalent in automotive systems every year. As hybrid and electric vehicles become more popular, the quantity of automotive AC drive systems in the field will grow rapidly. They can be used in either electric or hybrid vehicles as a part the propulsion system. In a typical application, the motor drive requires a position or speed sensor device to properly control the motor. Fault tolerance and robustness are important features to insure trouble-free operation of the vehicle. In a typical drive system, failure of the position/speed sensor will cause a loss of propulsion fault. This would leave the driver stranded with no means of moving the vehicle.

Most fault detection and fault tolerant approaches focus on faults of power semiconductors in an inverter and motor windings. In one approach, sensor faults of an induction motor drive system are identified and the control system is reconfigured according to the specific fault of the sensor. The control system tolerates the faults by changing the control algorithm from a high performance indirect vector control to a simple volts/hertz (V/Hz) control. As a result, the traction system of the vehicle provides gracefully degraded performance according to the faults.

In "Fault Tolerant Operation of Induction Motor Drives With Automatic Controller Reconfiguration", Sepe, R. B., Jr., Fahimi, B., Morrison, C., and Miller, J. M., Electric Machines and Drives Conference, 2001, IEMDC 2001. IEEE International, 2001, pages 156–162, a fault tolerant drive system for asynchronous induction type machines in automotive applications is described. A reconfigurable control scheme is used to provide fault tolerance. The control may operate in one of 3 modes: sensor based indirect field-oriented controls (IFOC), rotor flux estimator (sensorless) based IFOC, and a scalar V/Hz mode.

The operation of the position/speed sensing device is monitored. Position/speed sensors generally have high cost and low reliability. The position sensor presents a single point failure that can cause a loss of propulsion. In the event of a sensor failure, the control system switches to rotor flux estimator (sensorless) based IFOC. The rotor flux estimator based IFOC has limitations at low speeds. Therefore, at low speeds the control system switches over to the lower grade scalar V/Hz type control. The open loop V/Hz type control suffers from poor performance as compared to IFOC controls.

SUMMARY OF THE INVENTION

A control system for a motor including a rotor comprises a sensorless sensor module that includes a first estimator module that generates a first rotor position signal based on a first sensorless approach and a second estimator module that generates a second rotor position signal based on a second sensorless approach. A selector selects the first rotor position signal for rotor speeds below a first rotor speed and the second rotor position signal for rotor speeds above the first rotor speed. A rotor position sensor senses a position of the rotor and generates a third rotor position signal. A fault detection module senses faults in the rotor position sensor and outputs the third rotor position signal when a fault is not detected and one of the first and second rotor position signals when the fault is detected.

In other features, an indirect field oriented control (IFOC) system controls the motor based on a selected one of the first, second and third rotor position signals.

In other features, the fault detection module compares the third rotor position signal to one of the first and second rotor position signals and senses the fault based on the comparison. The fault detection module generates a difference between the third rotor position signal and one of the first and second rotor position signals, compares the difference to a threshold, and generates the fault if the difference is greater than a first threshold.

In still other features, the first sensorless approach is a saliency-based approach and the second sensorless approach is a back electromotive force (emf)-based approach.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses. For purposes of clarity, the same reference numbers will be used in the drawings to identify similar elements. As used herein, the term module and/or device refers to an application specific integrated circuit (ASIC), an electronic circuit, a processor (shared, dedicated, or group) and memory that execute one or more software or firmware programs, a combinational logic circuit, or other suitable components that provide the described functionality.

The present invention switches over to sensorless-based motor control algorithm upon detection of a position/speed sensor failure to preserve at least a minimal amount of propulsion torque. A sensorless position estimator module uses a saliency-based technique at low speeds and a back-EMF based technique at high speeds. With this combination, the sensorless position estimator is valid at all motor speeds, including zero stator frequency.

Figure 1:
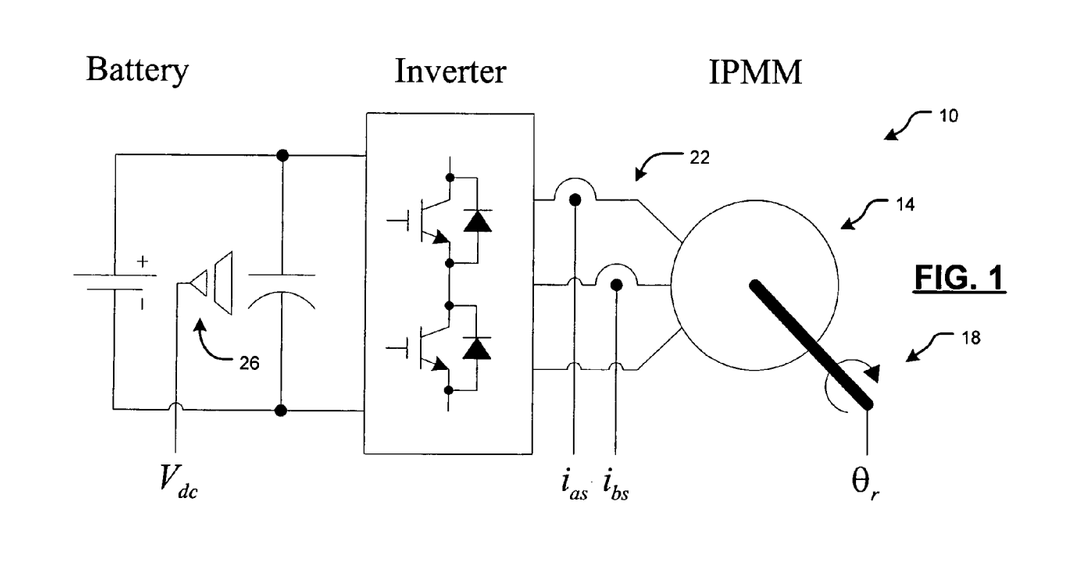
FIG. 1 is an electrical schematic of an exemplary IPMM drive system and sensors.

Referring now to FIG. 1, a drive system 10 including a motor 14 and sensors is shown. Rotor position is measured by an absolute encoder or a resolver 18, stator currents (a-phase and b-phase) are measured by two hall-effect sensors 22. DC link voltage is measured by an isolated transducer 26. It is assumed that the drive system 10 is under operation with a position sensor-based maximum torque per ampere control.

Figure 2:
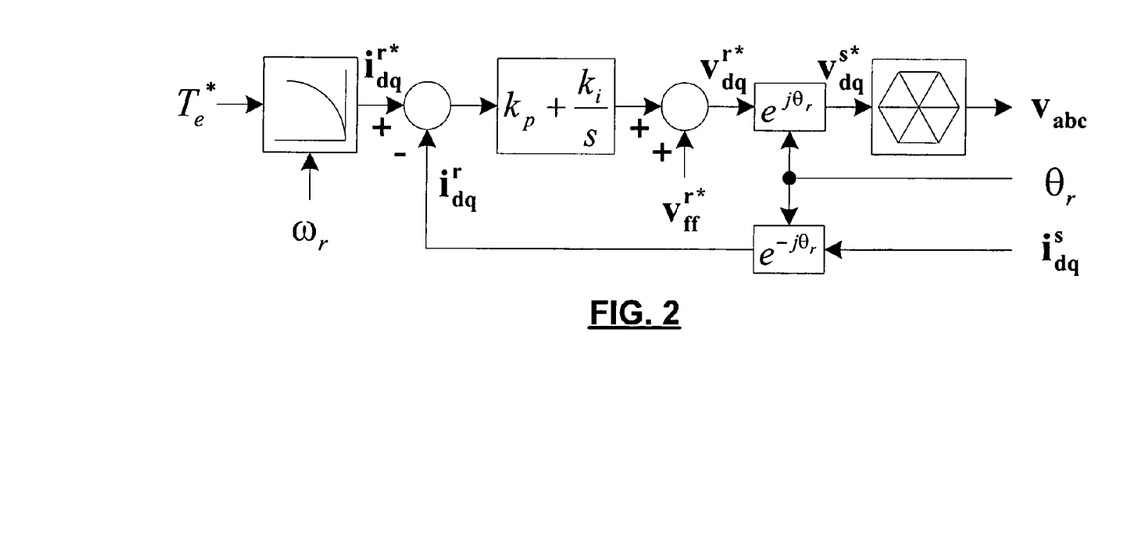
FIG. 2 is a control block diagram of IPMM drive.

Referring now to FIG. 2, a control block diagram is shown where a proportional and integral (PI) controller with back-emf decoupling terms are used for current regulation in the synchronously rotating reference frame. The faults of a rotor position sensor may result in immediate over-current trip of the drive system 10 in the heavy load or high speed operating condition due to the decoupling failure of d- and q-axis current controllers. In a light load and low speed condition, the torque linearity would not be maintained and the faults eventually lead to over-current trip.

To detect the fault of the angle sensor 18, a sensorless control system is used for the rotor angle estimation. If the difference between the measured angle and the estimated one is larger than a threshold value, then the control system is reconfigured to the sensorless control. Additional signals may be available from the position sensor decode circuitry to determine the validity of the measured position signal. These additional signals can also be used to determine the fault status of the angle sensor.

In the case of low speed operation including starting, where the back-emf is too small to give the accurate rotor position, the high frequency injection method may be used. The performance of a sensorless IPMM drive is comparable to that of a sensor-based one due to the inherent rotor saliency of the IPMM. In either low or high speed operation of the IPMM, the seamless transition from sensor based to position sensorless control can be achieved with proper transition algorithm design.

In high speed operation with large inertia, which is usually the case in a vehicle drive, a seamless transition can be made from the sensor-based control to the sensorless back-emf-based control. After the inverter is tripped due to the sensor faults and the phase current reaches zero, the current command in the synchronous reference frame can be set to zero and the back-emf (the output of the PI regulator) can be estimated if the IPMM is still running due to the system inertia. Based on the estimated back-emf, a sensorless control algorithm can start without stopping the IPMM.

Figure 3:
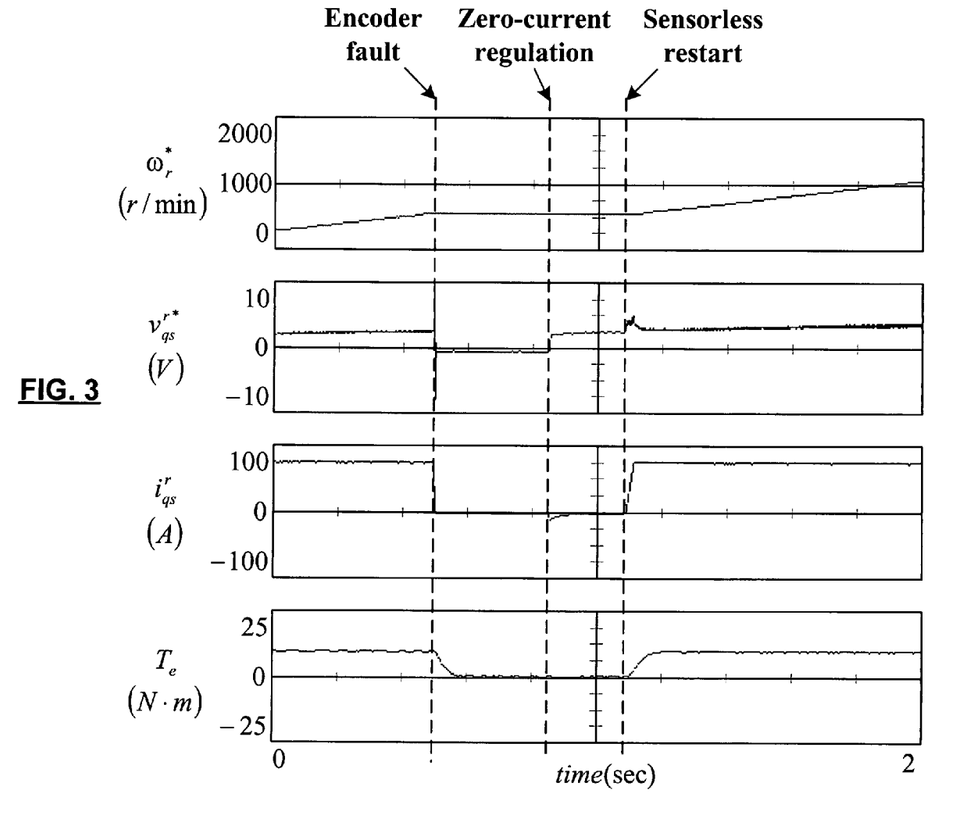
FIG. 3 are graphs illustrating a position sensorless restart of IPMM in case of encoder/resolver fault when while the machine is running.

The torque variation during initial current regulation period depends on the bandwidth of the current regulator and the motor speed. The experimental result is depicted in FIG. 3, where the IPMM parameters are shown in Table I.

TABLE I

IPMM PARAMETERS

| Parameter | Value |
| --- | --- |
| Pole pairs (PP) | 4 |
| Stator resistance ($R_S$) | 8.4 (mΩ) |
| Stator d-axis inductance ($L_{ds}$) | 100 ($\mu$H) |
| Stator q-axis inductance ($L_{qs}$) | 300 ($\mu$H) |
| Rotor magnet flux linkage ($\lambda_m$) | 0.01226 (Wb · turns) |

The faults of a DC link voltage sensor can be detected by comparing of the "measured" DC link power based on (1) and the estimated power by (2).

$$P_{in1} = \frac{3}{2}(v_{ds}^{r*} i_{ds}^{r} + v_{qs}^{r*} i_{qs}^{r}) \quad (1)$$

$$P_{in2} = \frac{3}{2} R_s(i_{ds}^{r2} + i_{qs}^{r2}) + \frac{\hat{T}_e \omega_r}{PP} + \hat{P}_{iron} + \hat{P}_{inverter} \quad (2)$$

where PP stands for pole pairs, $\hat{T}_e$ for the estimated torque by IPMM parameters and line currents, and $\hat{P}_{iron}$ for the estimated iron loss which is a function of rotor speed and line currents, and $\hat{P}_{inverter}$ for the estimated inverter loss.

At low speed and in light load condition, the detection is difficult because the power itself is too small. If the fault is detected, then the information from the sensor can be disregarded and the value of DC link voltage can be set as a nominal value in the current controllers. The error in the voltage information results in mistuned gains of the current controller. Hence, for successful operation without voltage sensor it is important that the system stability should be guaranteed with at least ±50% variation of controller gains and feedforward terms due to the battery voltage variation.

Sudden severe faults of a current sensor result in the overcurrent malfunction of the system. If there is no proper protection scheme in the gate drive circuit, it leads to the irrecoverable faults of power semiconductors of the inverter. The minor faults such as gain drift and sensor offset would result in torque pulsations synchronized with the inverter output frequency. As the offset and scaling error increases, torque regulation degrades. Ultimately, if the offset and gain drift above certain level, this results in over-current trip at high speed and in heavy load conditions. The faults including the offset and gain drift can be easily detected when the machine is not rotating.

Figures 4, 5:
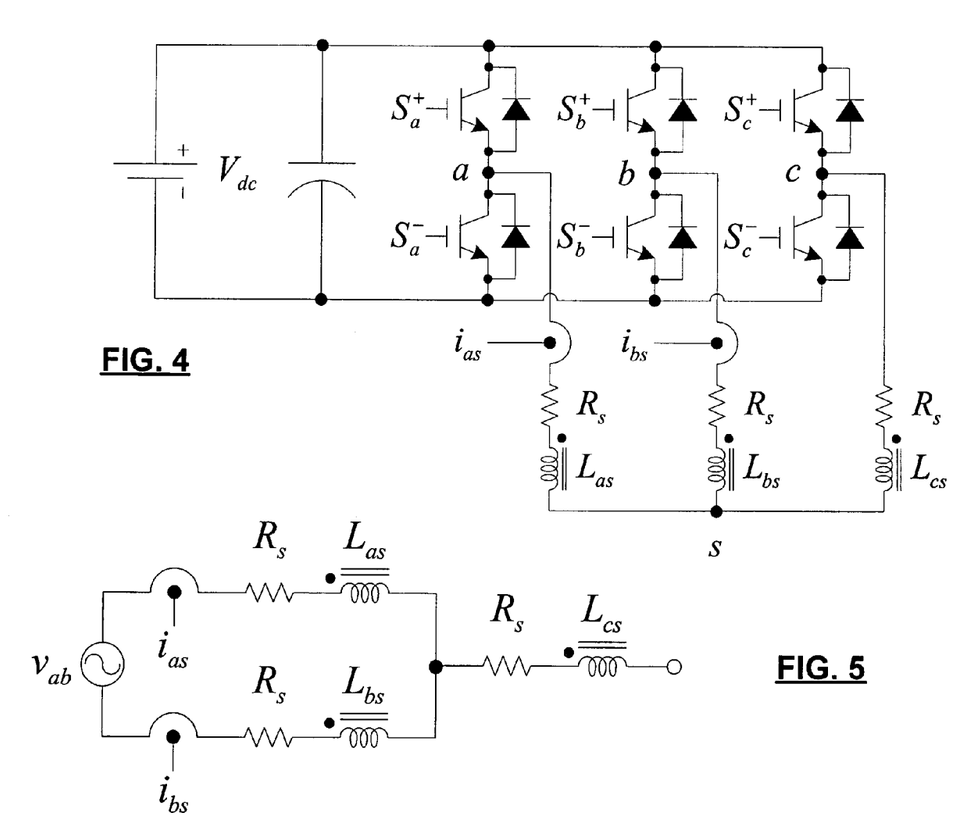
FIG. 4 is an electrical schematic of an inverter circuit and IPMM windings.
FIG. 5 is an equivalent circuit for c-phase blocked operation.

With the system shown in FIG. 4, at first the gating signals to c-phase semiconductor switches, i.e. $S_c^+$ and $S_c^-$ are blocked, and the line-to-line voltage $v_{ab}$ is synthesized by a PWM inverter as follows:

$$v_{ab} = V_m \sin(\omega t + \alpha) \quad (3)$$

where $V_m$ stands for the magnitude of the test voltage, $\omega$ for the angular frequency of the voltage, and $\alpha$ for the initial phase angle of the voltage. The system in FIG. 4 can be expressed as an equivalent circuit as shown in FIG. 5. The current flowing in the circuit as a result of the voltage in (3) can be derived as follows:

$$i_a = -i_b = \frac{V_m}{Z}\left\{\sin(\omega t + \alpha - \phi) + \sin(\alpha - \phi)e^{-\frac{2R_s}{L_{ab}}t}\right\} \quad (4)$$

where $Z=\sqrt{4R_s^2+\omega^2 L_{ab}^2}$, $$\phi = \tan^{-1}\frac{\omega L_{ab}}{2R_s}.$$

Figure 6:
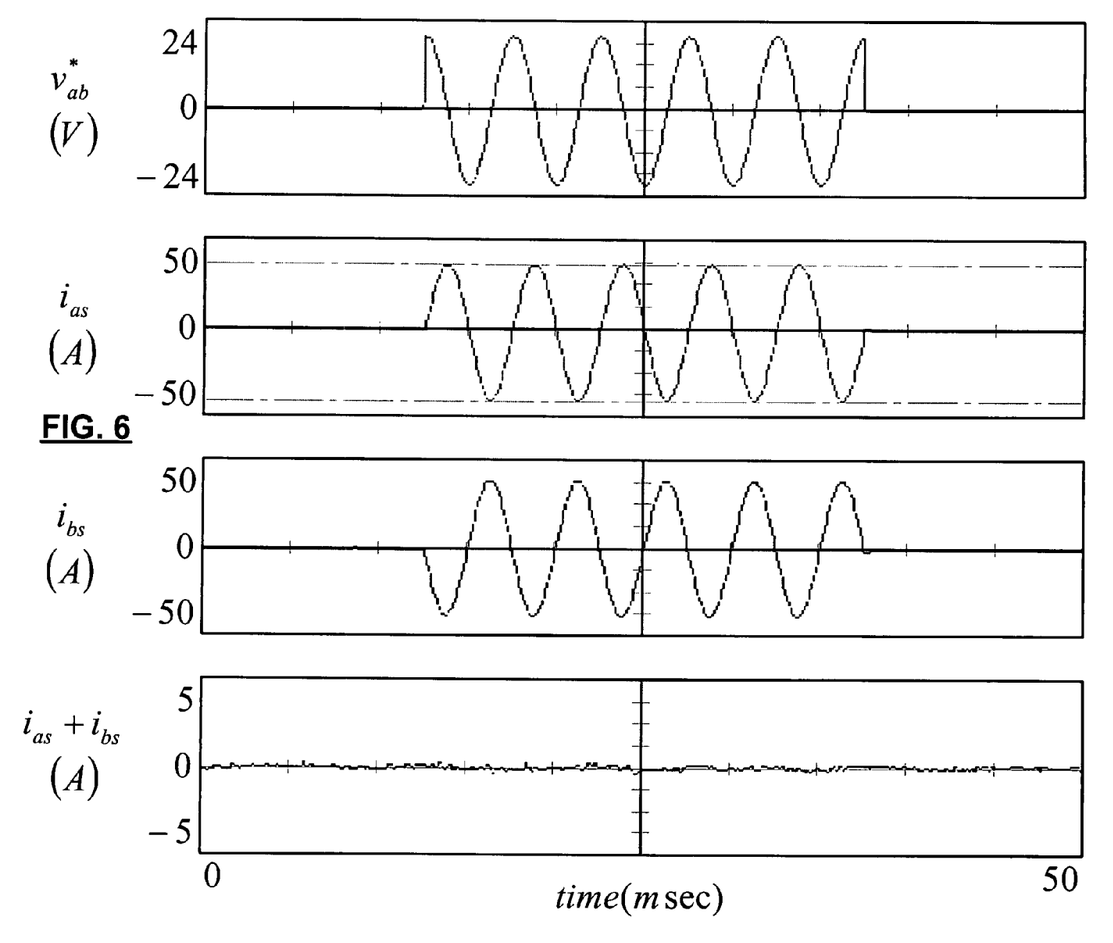
FIG. 6 are graphs illustrating measured current for c-phase blocked operation.

$R_s$ in (4) stands for the sum of the winding resistance of the IPMM and the conduction resistance of the power semiconductor. $L_{ab}$ denotes the inductance between a-phase terminal and b-phase terminal of the motor and is a function of the rotor position. From (4) it can be seen that the transient term can be suppressed by adjusting the voltage phase according to power factor of the circuit. FIG. 6 shows the traces of the measured a-phase and b-phase current along with the applied reference voltage.

The inductance is several hundreds of $\mu$H varying with the rotor position. The resistance is around 10 m$\Omega$ including the resistance of power semiconductor. The time constant of the circuit is several tens of msec. However, with the proper setting of the initial phase angle of the reference voltage, there is no DC transient in the current trace. The frequency of the test voltage is 200 Hz and the duration is five cycles. Hence the test takes only 25 msec. If the winding, the inverter and the current sensors have no problem, the measured a-phase and b-phase current should be the same in magnitude and opposite in sign as shown in FIG. 6. Also, the root mean square (RMS) value of the current should be around the value of the steady state term of (4). Furthermore the total sum of the measured values of each phase current should be around zero due to the zero DC transient, otherwise there might be significant offset error in case of the current sensor faults or other faults in inverter power circuits or IPMM windings.

Figure 7A:
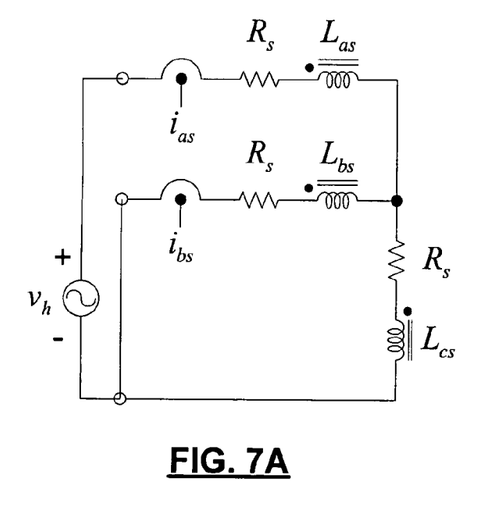
FIGS. 7A–7C illustrate test circuits for fault detection of current sensors for phases a and b, b and c and c and a, respectively.
Figure 7B:
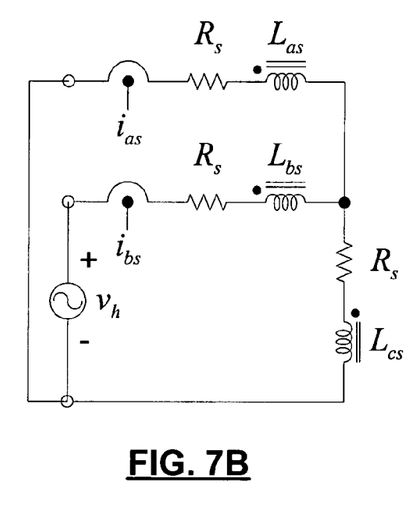
Figure 7C:
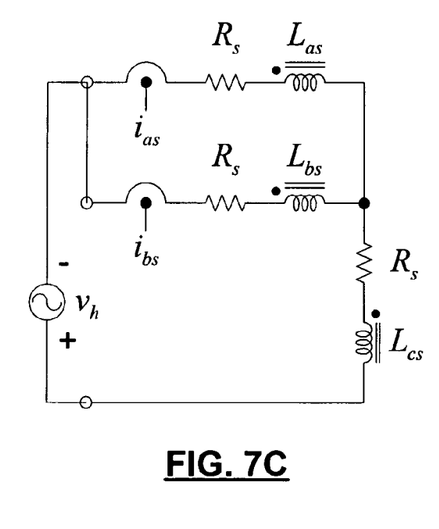

Next, another test voltage of the same type as (3) is applied between a-phase and b-phase terminal of the motor and c-phase terminal is shorted with b-phase as shown in FIG. 7A. The a-phase and b-phase current are measured and stored in a memory component of the digital control system. Then the voltage is applied between b-phase and c-phase as shown in FIG. 7B, and lastly as in FIG. 7C. The sum of the stored phase current at each corresponding time in FIG. 7 should be time point-wise zero if the inverter and the motor windings are well balanced.

If the faulted sensor is detected in this way, the measured value from it can be disregarded. The d- and q-axis current in the synchronously rotating reference frame are regulated based on the estimated currents which are observed by an open-loop observer in case that neither of the current sensors is available. The stator voltage model of IPMM in the synchronously rotating reference frame can be expressed as follows.

$$\begin{bmatrix} v_{ds}^r \\ v_{qs}^r \end{bmatrix} = \begin{bmatrix} R_s + L_d\frac{d}{dt} & -\omega_r L_q \\ \omega_r L_d & R_s + L_q\frac{d}{dt} \end{bmatrix}\begin{bmatrix} i_{ds}^r \\ i_{qs}^r \end{bmatrix} + \begin{bmatrix} 0 \\ \omega_r \lambda_M \end{bmatrix}. \quad (5)$$

The estimated current of the open-loop observer in steady-state takes the following form:

$$\begin{bmatrix} \hat{I}_{ds}^r \\ \hat{I}_{qs}^r \end{bmatrix} = \begin{bmatrix} \frac{R_s\hat{R}_s + \omega_r^2 L_{ds}\hat{L}_{qs}}{\hat{R}_s^2 + \omega_r^2 \hat{L}_{ds}\hat{L}_{qs}} & \frac{\omega_r(\hat{L}_{qs}R_s - L_{qs}\hat{R}_s)}{\hat{R}_s^2 + \omega_r^2 \hat{L}_{ds}\hat{L}_{qs}} \\ \frac{\omega_r(L_{ds}\hat{R}_s - \hat{L}_{ds}R_s)}{\hat{R}_s^2 + \omega_r^2 \hat{L}_{ds}\hat{L}_{qs}} & \frac{R_s\hat{R}_s + \omega_r^2 L_{ds}\hat{L}_{qs}}{\hat{R}_s^2 + \omega_r^2 \hat{L}_{ds}\hat{L}_{qs}} \end{bmatrix} \begin{bmatrix} I_{ds}^r \\ I_{qs}^r \end{bmatrix} + \begin{bmatrix} \frac{\omega_r^2 \hat{L}_{qs}}{\hat{R}_s^2 + \omega_r^2 \hat{L}_{ds}\hat{L}_{qs}} \\ \frac{\omega_r \hat{R}_s}{\hat{R}_s^2 + \omega_r^2 \hat{L}_{ds}\hat{L}_{qs}} \end{bmatrix}(\lambda_M - \hat{\lambda}_M) \quad (6)$$

where the capitalized state variables are dc values and the circumflexed parameters are estimated values.

It should be noted that the estimation errors in two particular steady-state conditions are a result of two different parameters. The error at standstill is proportional to the stator resistance. The error at zero current is proportional to the rotor magnet flux linkage.

If either of the current sensors is available, a closed-loop observer can be used to estimate the stator currents. The current error vector with single phase feedback in the stationary reference frame can be defined as follows if the other current errors are assumed to be negative one half of the sensed one.

$$\Delta i_{abc}^s = 2(i_s - \hat{i}_s)e^{j\frac{2n}{3}\pi} = \Delta i_{dq}^s + \Delta i_{dq}^{s*}e^{-j\frac{2n}{3}\pi} \quad (7)$$

where $i_s$ is the measured current, $\hat{i}$ is the estimated current of the corresponding phase, and n is zero with sensing a-phase, one with b-phase, and two with c-phase, hereafter. This yields the following in the synchronously rotating reference frame.

$$\Delta i_{abc}^r = \Delta i_{abc}^s e^{-j\theta_r} = \Delta i_{dq}^r + \Delta i_{dq}^{r*}e^{-j(2\theta_r + \frac{2n}{3}\pi)} \quad (8)$$

Figure 8:
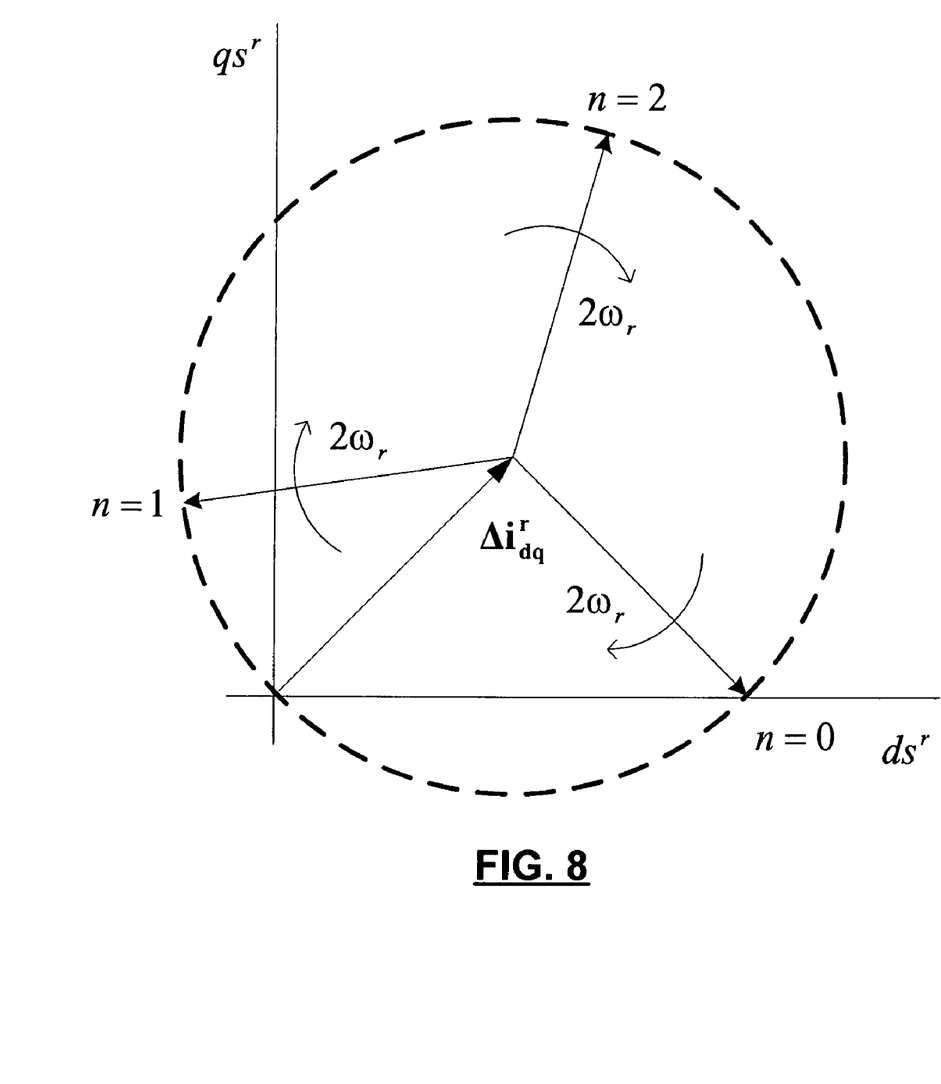
FIG. 8 illustrates a trajectory of a current error in the synchronous reference frame.

Referring now to FIG. 8, the error vector has an additional term which has the same magnitude but rotates in the opposite direction at a speed of $2\omega_r$. This phenomenon is a result of insufficient current information feedback due to single sensor fault. From the viewpoint of a state-space representation, this error can be interpreted as a time-varying and cross-coupling effect of the observer gains, which takes the following form.

$$\begin{bmatrix} 1 & 0 \\ 0 & 1 \end{bmatrix} + \begin{bmatrix} \cos\left(2\theta_r + \frac{2n}{3}\pi\right) & \sin\left(2\theta_r + \frac{2n}{3}\pi\right) \\ -\sin\left(2\theta_r + \frac{2n}{3}\pi\right) & \cos\left(2\theta_r + \frac{2n}{3}\pi\right) \end{bmatrix} \quad (9)$$

$$\begin{bmatrix} 1 & 0 \\ 0 & -1 \end{bmatrix} = \begin{bmatrix} 1 + \cos\left(2\theta_r + \frac{2n}{3}\pi\right) & -\sin\left(2\theta_r + \frac{2n}{3}\pi\right) \\ -\sin\left(2\theta_r + \frac{2n}{3}\pi\right) & 1 - \cos\left(2\theta_r + \frac{2n}{3}\pi\right) \end{bmatrix} \equiv G_s(\theta_r)$$

Figure 9:
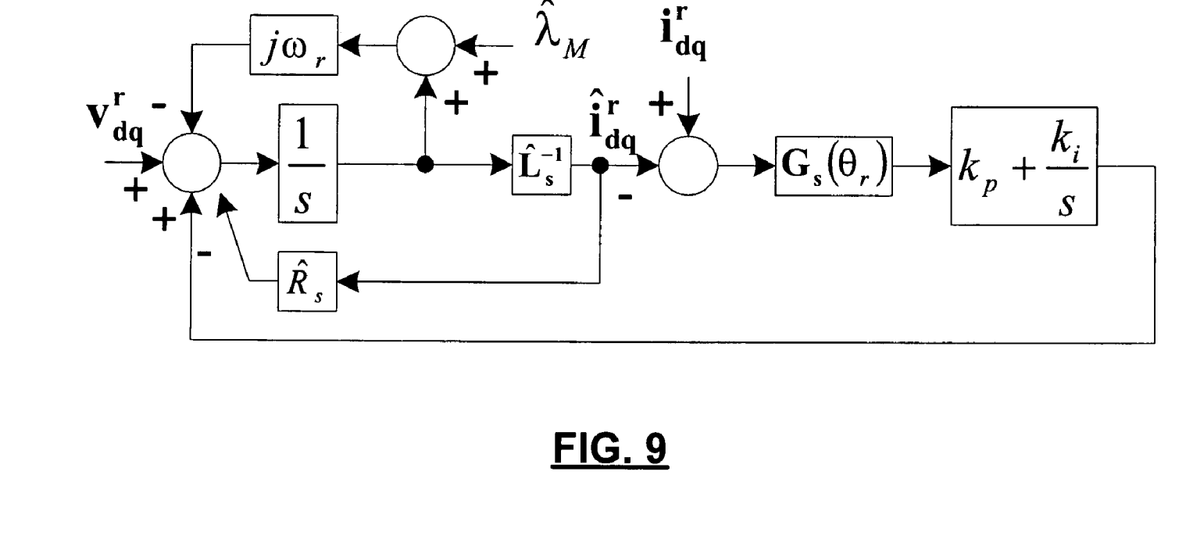
FIG. 9 is a control block diagram for a closed-loop observer with a sensor gain matrix.

Thus the observer depicted in FIG. 9 can be analyzed in the unified complex vector form. In normal operation, both of the current sensors are utilized, and the sensor gain matrix is the identity matrix. If either sensor fails, it is replaced with the singular matrix in (9). Furthermore, if the other breaks down, it becomes the zero matrix which is equivalent to a open-loop observer.

Figure 10A:
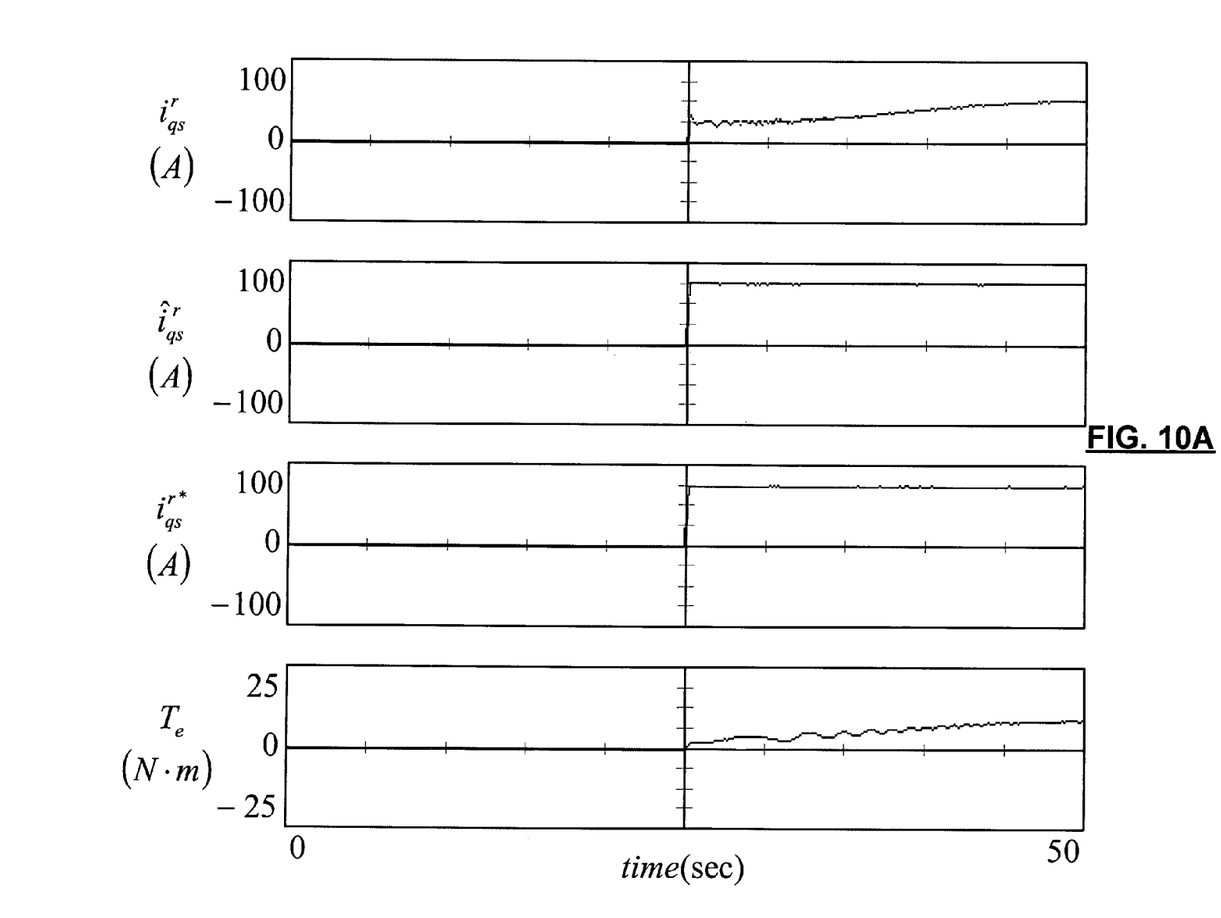
FIGS. 10A and 10B are graphs illustrating current estimation and regulation with the observer in the case of sensor faults for open loop without current sensor and closed loop with a single current sensor, respectively.

Referring now to FIG. 10A, the experimental result without current sensor shows current regulation based on the open-loop observer. The observer parameters are intentionally mistuned to show the feasibility of the open-loop observer. The current regulation performance is poor but the drive system can be operated with the reduced capability due to the considerable steady-state error.

Figure 10B:
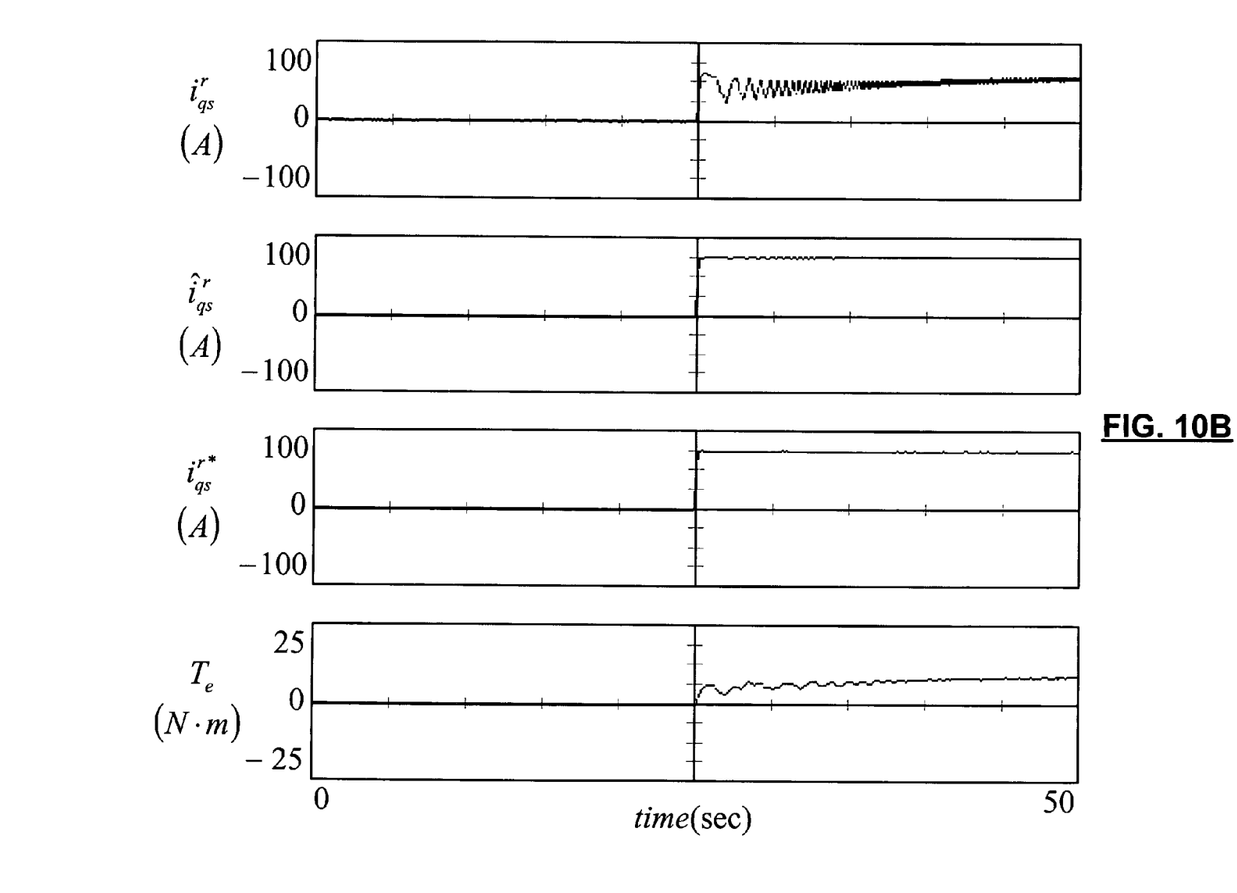

Referring now to FIG. 10B, the result with a single current sensor is shown based on the closed-loop observer using a P-type controller. With the same amount of parameter mistuning, the dynamic characteristic is improved compared with that of the open-loop case. The measured current, however, has some ripple due to the limitation of current measurement. The ripple frequency is twice the motor speed. The steady-state error would be zero if the observer used a PI-type controller instead of P-type.

For each potential sensor failure, a fault detection algorithm and post-fault control scheme has been developed. Transition from fault mode to post-fault operational mode is seen to be smooth and graceful. The resultant drive provides slightly degraded performance in the case of some faults (dc voltage sensor and current sensor), but still allows crucial limp home capability in those cases. Additional information relating to current sensor faults can be found in U.S. patent application Ser. No. 10/452,817, filed Jun. 2, 2003.

For the case of a position sensor fault, a sensorless rotor position estimation scheme is used to provide post-fault control. A combination of saliency-based and model-based position estimation is utilized to obtain a rotor position estimate at all operating speeds. For the case of DC link voltage sensor failure, the estimated and measured DC input power are compared in order to detect sensor malfunction. The design of the current regulators to guarantee post-fault stability is discussed. Lastly, in the case of current sensor failure, a sequence of simple tests is devised to detect the sensor failure. Missing current information is obtained using a state observer to estimate the unknown quantities.

Figure 11:
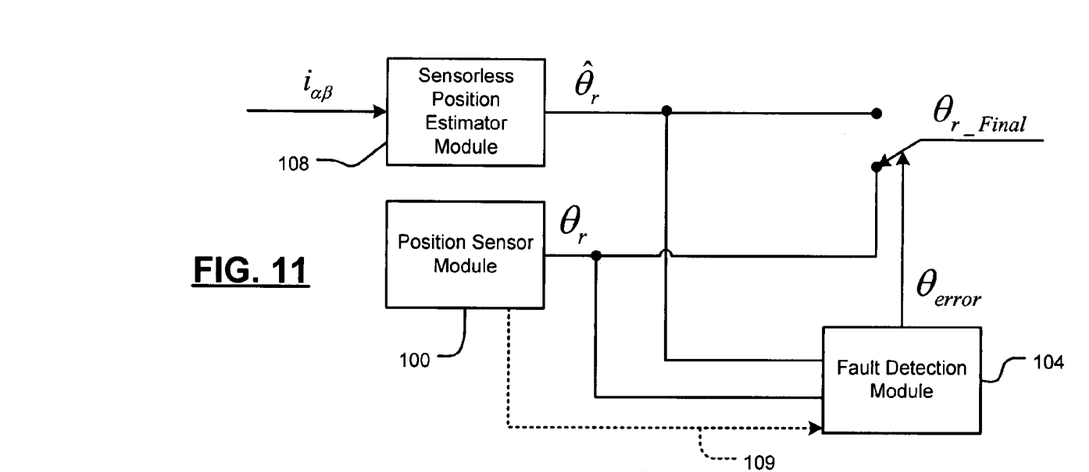
FIG. 11 is a functional block diagram illustrating a fault detection module that senses sensor faults and switches to a sensorless position estimator module.
Figure 12:
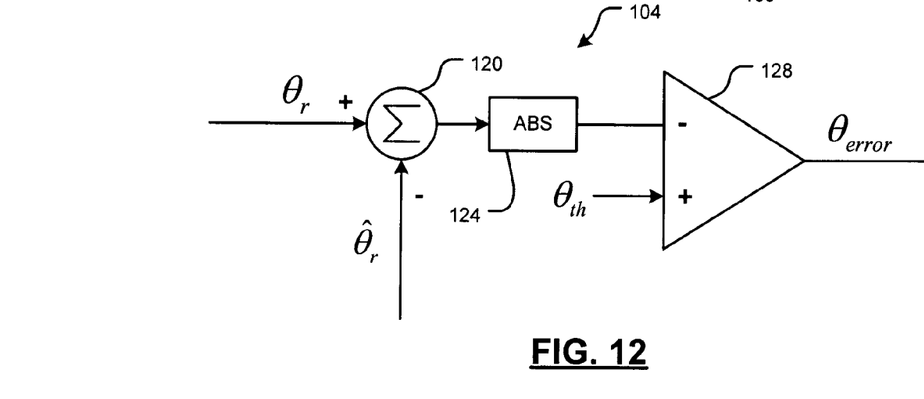
FIG. 12 is a functional block diagram of the fault detection module according to some embodiments.
Figure 13:
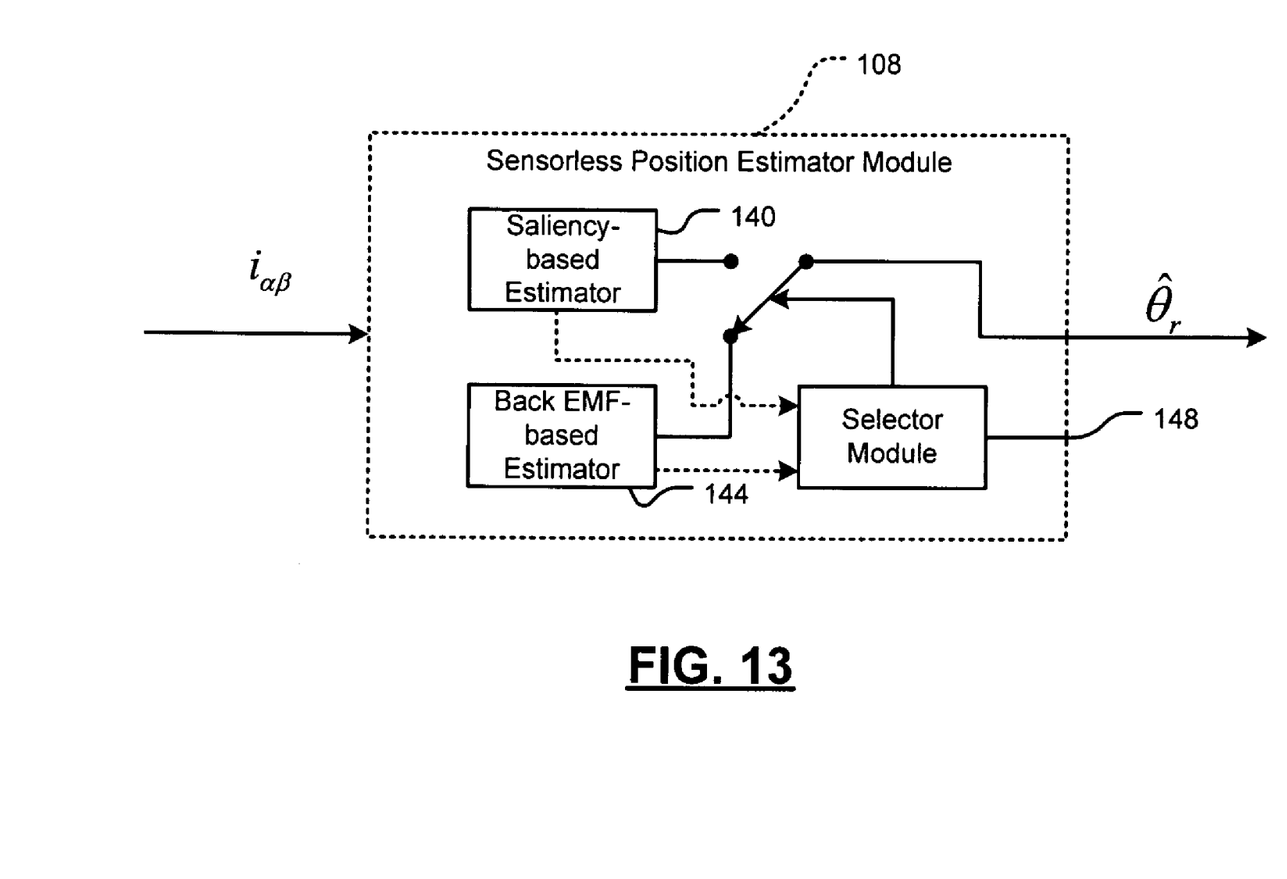
FIG. 13 is a functional block diagram of a sensorless position estimator module according to some embodiments.

Referring now to FIGS. 11–13, a rotor position or rotor speed sensor module 100 provides a primary motor control feedback. In some embodiments, the sensor module 100 is a resolver or other similar device. A fault detection module 104 monitors the output of the position/speed sensor module 100 and a sensorless position estimator module 108 and selectively generates an error signal. A fault signal 109 may optionally be available from the position sensor module 100 in addition to or instead of this approach and can be utilized by the fault detection module 104. For example, if a resolver is used, it may be a resolver to digital converter circuit. The resolver to digital converter circuit can detect certain failures and generate fault signals. In event of fault, control switches over to a sensorless mode of operation. The sensorless position estimator module 108 can be any type of sensorless position estimator. The primary mode of control remains field-oriented control (FOC) whether using the output of the sensor module 100 or the output of the sensorless position estimator.

The position sensorless-based motor control retains an acceptable level of controllability of the motor torque. This will allow the driver to continue operation of the vehicle at a reduced level of performance until it can be diagnosed at a service station. This mode of operation is referred to as "sensorless limp home" mode. While FIG. 11 is illustrated with a position sensor typically used for the synchronous type AC machine, the present invention also applies to asynchronous induction machines using speed sensors.

In FIG. 12, the fault detection module 104 according to some embodiments is shown. $\theta_r$ from the position/speed sensor module 100 is input to a non-inverting input of a summer 120. $\hat{\theta}_r$, which is from the sensorless position estimator module 108, is input to an inverting input. An output of the summer 120 is input to an absolute voltage (ABS) module 124. An output of the absolute value module 124 is input to an inverting of a comparator 128. A threshold $\theta_{th}$ is input to a non-inverting input of the comparator 128. The output of the comparator 128 goes low when the absolute value of the difference exceeds the threshold $\theta_{th}$. As noted earlier, the fault signal 109 may be provided by the position sensor module in addition to and/or instead of approach and can also be used to set the signal $\theta_{error}$.

In FIG. 13, the sensorless position estimator module 108 according to some embodiments is shown. The sensorless position estimator 108 includes a saliency-based estimator 140 and a back emf based estimator 144. A selector module 148 selects an output of one of the estimators 140 and 144 based on speed. A typical speed for switch-over may be 5–10% of rated speed. While saliency-based and back emf methods are shown, other position sensorless approaches may be used.

The present invention provides fault tolerance to position/speed sensor faults. In the absence of any fault, the primary motor control utilizes the available position/speed sensor information, and performance is not degraded. Under sensor fault conditions, the control continues to use field-oriented control, which provides good dynamic performance and torque control. The present invention works down to zero stator frequency.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A control system for a motor including a rotor, comprising:
   a sensorless sensor module that includes:
      a first estimator module that generates a first rotor signal using a first sensorless approach;
      a second estimator module that generates a second rotor signal using a second sensorless approach; and a selector that selects said first rotor signal for rotor speeds below a first rotor speed and said second rotor signal for rotor speeds above said first rotor speed;

a rotor sensor that senses at least one of a position and/or speed of said rotor and that generates a third rotor signal; and a fault detection module that senses faults in said rotor sensor and that outputs said third rotor signal when a fault is not detected and one of said first and second rotor signals when said fault is detected.

2. The control system of claim 1 further comprising an indirect field oriented control (IFOC) system that controls said motor based on a selected one of said first, second and third rotor signals.

3. The control system of claim 1 wherein said fault detection module compares said third rotor signal to one of said first and second rotor signals and senses said fault based on said comparison.

4. The control system of claim 1 wherein said fault detection module generates a difference between said third rotor signal and one of said first and second rotor signals, compares said difference to a first threshold, and generates said fault if said difference is greater than a first threshold.

5. The control system of claim 1 wherein said first estimator module uses a saliency-based approach to generate said first rotor signal and said second estimator module uses a back electromotive force (emf) approach to generate said second rotor signal.

6. A control system for a motor including a rotor, comprising:
a sensorless sensor module that includes:
a saliency-based estimator module that generates a first rotor position signal using a saliency-based approach;
a back electromotive force (emf) estimator module that generates a second rotor position signal using a back emf-based approach; and
a selector that selects said first rotor position signal for rotor speeds below a first rotor speed and said second rotor position signal for rotor speeds above said first rotor speed;
a rotor position sensor that senses a position of said rotor and that generates a third rotor position signal;
a fault detection module that senses faults in said rotor position sensor and that outputs said third rotor position signal when a fault is not detected and one of said first and second rotor position signals when said fault is detected; and
an indirect field oriented control (IFOC) system that controls said motor based on a selected one of said first, second and third rotor position signals.

7. The control system of claim 6 wherein said fault detection module compares said third rotor position signal to one of said first and second rotor position signals and senses said fault based on said comparison.

8. The control system of claim 6 wherein said fault detection module generates a difference between said third rotor position signal and one of said first and second rotor position signals and compares said difference to a threshold.

9. The control system of claim 8 wherein said fault detection module generates said fault if said difference is greater than a first threshold.

10. A method for controlling a motor including a rotor, comprising:
generating a first rotor signal using a first sensorless approach;
generating a second rotor signal using a second sensorless approach;
selecting said first rotor signal for rotor speeds below a first rotor speed and said second rotor signal for rotor speeds above said first rotor speed;
sensing at least one of a position and/or speed of said rotor using a rotor position sensor and generating a third rotor signal;
sensing faults in said rotor position sensor; and
selecting said third rotor signal when a fault is not detected and one of said first and second rotor signals when said fault is detected.

11. The method of claim 10 further comprising using an indirect field oriented control approach to control said motor based on a selected one of said first, second and third rotor signals.

12. The method of claim 10 further comprising comparing said third rotor signal to one of said first and second rotor signals and sensing said fault based on said comparison.

13. The method of claim 10 further comprising:
generating a difference between said third rotor signal and one of said first and second rotor signals;
comparing said difference to a threshold; and
generating said fault if said difference is greater than a first threshold.

14. The method of claim 10 wherein said first rotor signal is generated using a saliency-based approach and said second rotor signal is generated using a back electromotive force (emf) technique.

15. A method for controlling a motor including a rotor, comprising:
generating a first rotor position signal using a sensorless saliency-based approach;
generating a second rotor position signal using a sensorless back electromotive force (emf) based approach;
selecting said first rotor position signal for rotor speeds below a first rotor speed and said second rotor position signal for rotor speeds above said first rotor speed;
sensing a position of said rotor using a rotor position sensor and generating a third rotor position signal;
sensing faults in said rotor position sensor;
selecting said third rotor position signal when a fault is not detected and one of said first and second rotor position signals when said fault is detected; and
using an indirect field oriented control (IFOC) approach to control said motor based on a selected one of said first, second and third rotor position signals.

16. The method of claim 15 further comprising comparing said third rotor position signal to one of said first and second rotor position signals and sensing said fault based on said comparison.

17. The method of claim 15 further comprising generating a difference between said third rotor position signal and one of said first and second rotor position signals and comparing said difference to a threshold.

18. The method of claim 17 further comprising generating said fault if said difference is greater than a first threshold.

* * * * *